Sept. 6, 1955  E. H. BIRDSALL  2,716,893
MEANS AND APPARATUS FOR UTILIZING GYRODYNAMIC ENERGY
Filed Oct. 18, 1949  3 Sheets-Sheet 1
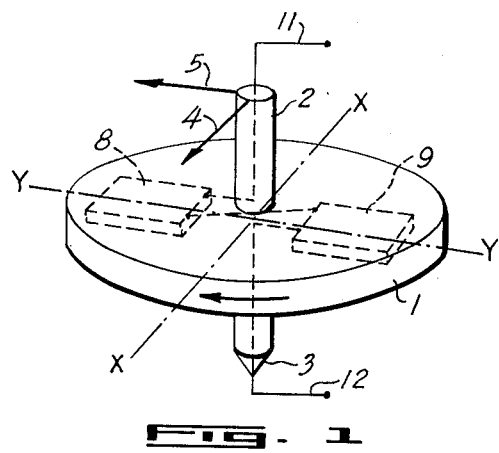
FIG. 1
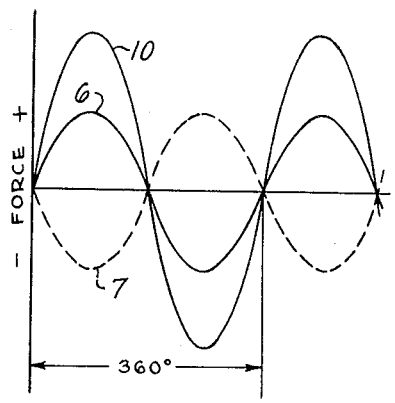
FIG. 2
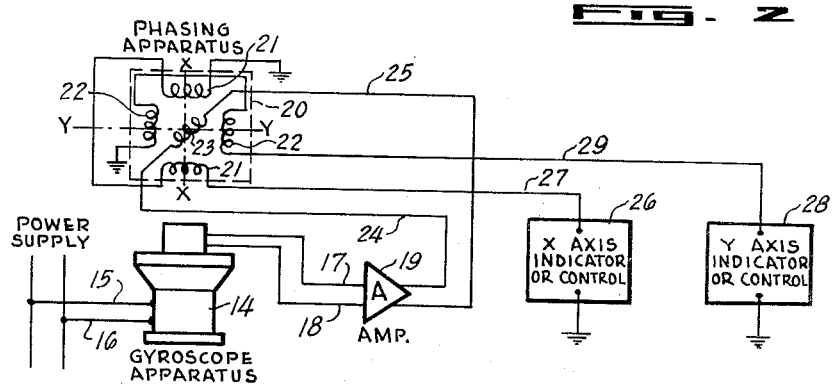
FIG. 3
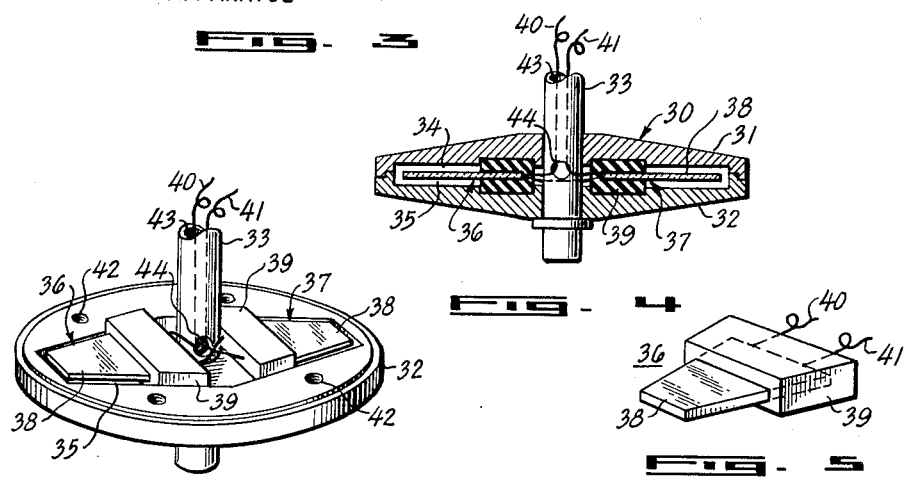
FIG. 4
FIG. 5
FIG. 6
INVENTOR.
Edwin H. Birdsall
BY

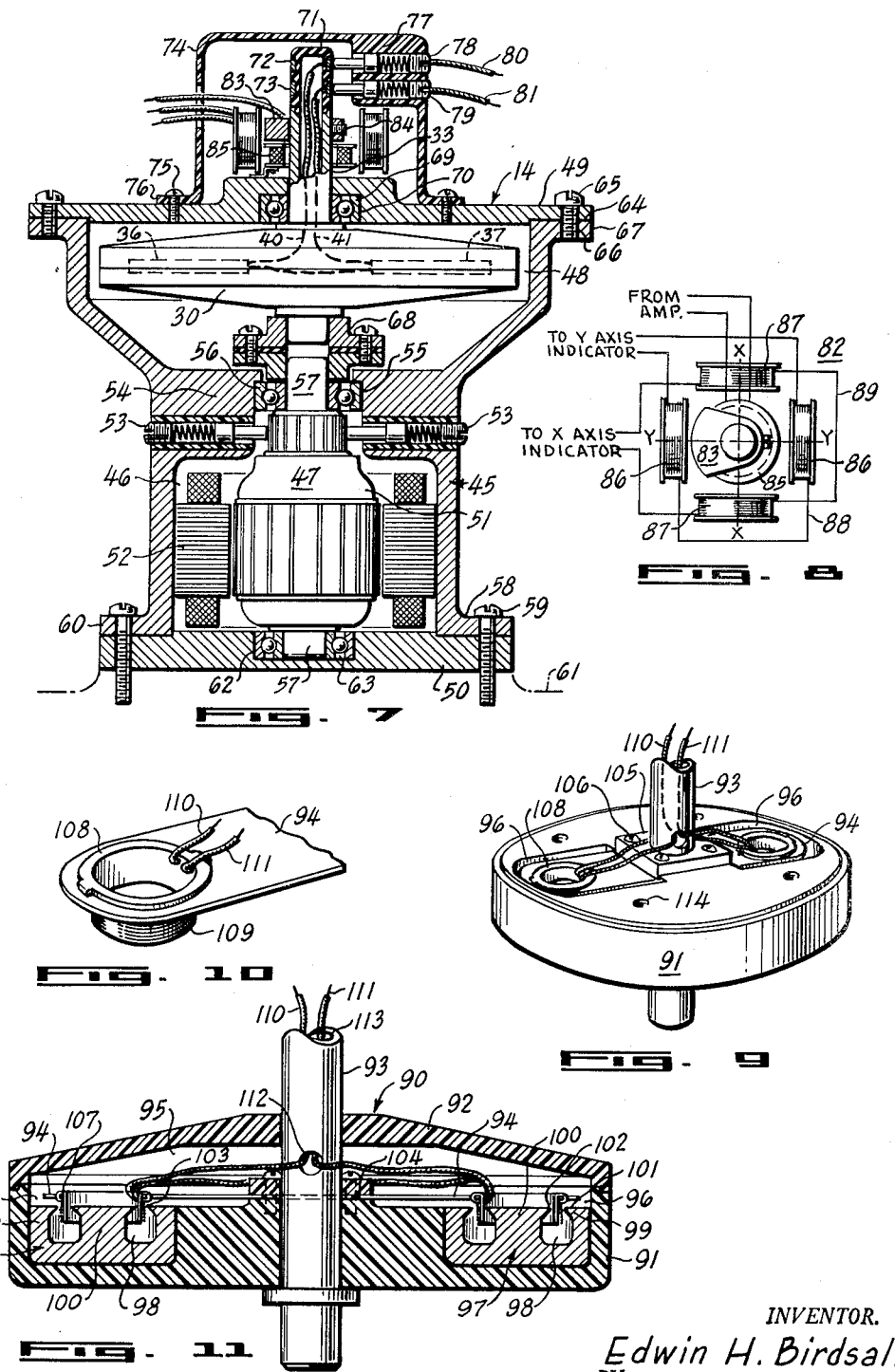

Sept. 6, 1955         E. H. BIRDSALL        2,716,893
MEANS AND APPARATUS FOR UTILIZING GYRODYNAMIC ENERGY
Filed Oct. 18, 1949                           3 Sheets—Sheet 3
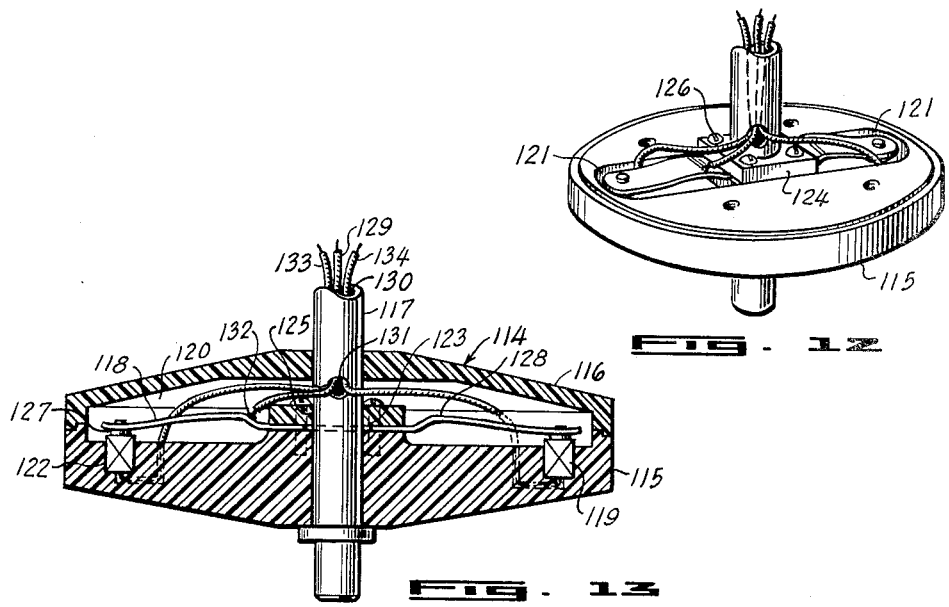
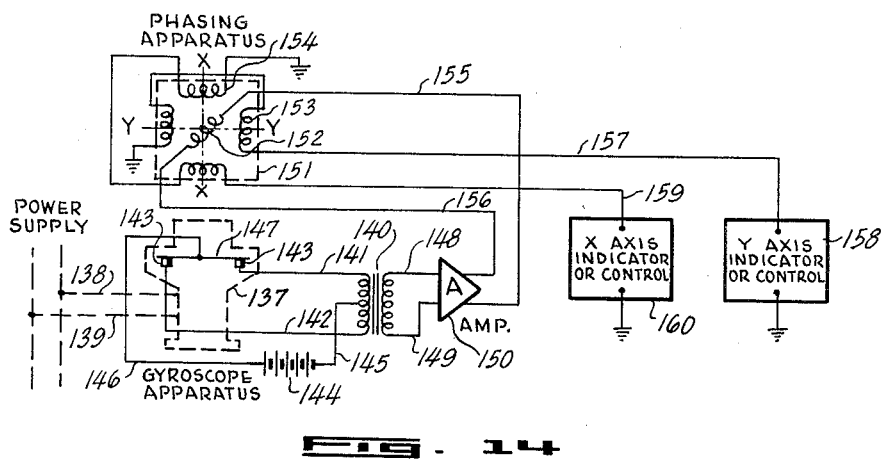
INVENTOR.
Edwin H. Birdsall
BY United States Patent Office 2,716,893
Patented Sept. 6, 1955

2,716,893

MEANS AND APPARATUS FOR UTILIZING GYRODYNAMIC ENERGY

Edwin H. Birdsall, San Diego, Calif., assignor, by mesne assignments, to General Dynamics Corporation, a corporation of Delaware Application October 18, 1949, Serial No. 122,036

25 Claims. (Cl. 74—5)

The present invention relates in general to the utilization of the gyrodynamic forces in a rotor, and is more particularly directed to a means of sensing the stress variations in a rotating body in order to apprehend disturbing forces or angular accelerations to which the supporting structure of the rotating body is subjected for the purpose of measurement or control.

It is commonly understood that the energy developed in gyroscopes of the spinning wheel variety is a function of the mass of the rotor. In many applications, especially where a gyroscope of this type is utilized for control or instrumentation, the weight of the rotor and its driving mechanism becomes objectionable. Additionally, the use of such devices is complicated by the necessity for providing relatively delicate bearing and support means in order to obtain accurate gyrodynamic reactions. Avoidance of drift in existing types of gyroscopes is dependent upon refinement of balance, and although excellent results may be obtained in this respect in original assembly, it is difficult to maintain in service due to physical changes that occur in the materials involved as a result, for example, of temperature changes. In "free" gyroscopes which are commonly used to establish a spatial reference plane in gyroscopic control systems, it is impossible to accommodate large angular maneuvers without encountering gimbal lock and "tumbling." Spring restrained "rate" gyroscopes, which are generally used to sense the rate of deviation or angular movement of the supporting framework, are in many instances unsatisfactory where the frequencies encountered in the maneuvers of the supporting structure are within the relatively limited resonant frequency range of the gyroscopic assembly. Partially restrained gyroscopes, as in the case of the "free" gyroscope, cannot accommodate large positional deviations without moving into a position of interlock between the general pivot and the axis of turn, and in that position produce no signal and lose spatial reference.

In conventional gyroscopic apparatus the gyrodynamic reactions of the rotor must act through the supporting shaft and the supporting framework before sensible apprehension of their character and magnitude may be realized and it is therefor apparent that the sensitivity of the instrument is to a large extent dependent upon the accuracy of the components and is effected by the accumulation of tolerances therein. A still further disadvantage inherent in conventional gyroscopic equipment resides in the continuous character of the signals they produce since these are not readily adaptable to electronic networks for their measurement or utilization.

The principal objective of the present invention is to provide an improved means of utilizing the gyrodynamic reactions on the elements of a rotating body in such a manner as to overcome all of the inherent faults and disadvantages of conventional gyroscopic apparatus as set forth above. This is accomplished by means of a non-resonant rotor comprising one or more sensing means disposed around a shaft adapted to be driven from a power means such as an electric motor. It is essential that the rotor be non-resonant with respect to the mounting structure since the forces resulting from resonant oscillation will increase to infinity and lose significance for the desired purposes of this invention, and where used herein, the term "non-resonant" is meant to have that connotation. The gyrodynamic reactions on the non-resonant sensing means resulting from forces tending to disturb the axis of rotation of the device produce signals which may be employed for measurement or control through suitable circuity. The sensing means may be any of various forms including stress or strain responsive devices such as piezoelectric crystals, magnetic transducers, or variable resistances. By this means, a gyroscopic apparatus is provided which is independent of heavy rotating masses and the power requirements are consequently reduced. Since pivotal suspension of the rotor is eliminated, there is no possibility of "drift" and no balancing of the rotor nor its supporting elements is required beyond that ordinarily employed in rotating machinery in order to promote smooth operation and relieve bearings from excessive vibration.

In the apparatus contemplated by the present invention, there are no limitations with respect to angular movement and since the design is such that the resonant frequency of the device is several times that of the surrounding framework, no limitations in regard to vibration exist. By directly apprehending the gyrodynamic reactions within the rotor itself, errors existing in conventional equipment due to transmission of the reactions through non-gyroscopic elements prior to their measurement are eliminated; and because the stress deviations in a rotor resulting from a disturbing force are cyclic in nature, the signals from the apparatus herein described are alternating in character and therefore are readily adaptable to phasing, amplification, and other functions most conveniently accomplished by electronic means.

Thus, one object of the present invention is to provide an improved means of utilizing gyrodynamic reactions in a rotating body which is independent of the mass of the rotor and requires less power.

Another object of the invention is to provide a means of directly apprehending the reactions of the elements of a rotating body which are subjected to gyrodynamic activity.

A further object of the invention lies in the provision of a gyroscopic apparatus in which strain-responsive elements are associated in the form of a non-resonant rotor to apprehend and sense the character of disturbing forces impressed upon the supporting structure without limitation as to angular movement and without the necessity of gimbals, or other similar means of pivotal suspension.

Still another object of the invention is to provide gyroscopic apparatus of the character under consideration capable of design within a wide frequency range in order that the resonant frequencies of the apparatus may be selected to be well beyond the frequency range of the supporting structure, so that vibration problems and failures resulting therefrom are eliminated.

A still further object of this invention lies in the provision of means for producing signals from a gyroscopic device which are cyclic or alternating in character as distinguished from the continuous signals obtained from conventional equipment for sensing gyrodynamic reactions.

Other objects and advantages of the invention will be apparent from a consideration of the following detailed description.

The invention consists in the several novel features which are hereinafter set forth and which are more particularly defined by claims at the conclusion hereof.

In the drawings which accompany and form a part of this specification and in which like numerals of reference denote corresponding parts throughout the several views:

Fig. 1 is a schematic representation of the invention for the purpose of explaining its operation and function;

Fig. 2 is a diagram illustrating the nature of the signals derived from the gyroscopic apparatus of the invention;

Fig. 3 is a schematic wiring diagram illustrating a typical circuit for utilizing the gyrodynamic reactions produced by certain forms of the apparatus of the invention;

Fig. 4 is a vertical section of a preferred form of a device embodying the invention in which the sensing means comprise piezoelectric crystals;

Fig. 5 is a perspective showing a preferred form of piezoelectric crystal as used in the device illustrated in Fig. 6;

Fig. 6 is a perspective view illustrating the rotor construction of the form of the invention shown in Fig. 4;

Fig. 7 is a vertical section of a non-resonant gyroscopic apparatus embodying the invention and utilizing the rotor illustrated in Figs. 4 and 6;

Fig. 8 is a partially schematic plan view of one form of phasing apparatus adaptable for use in connection with the invention;

Fig. 9 is a perspective of a rotor illustrating a modified form of the invention in which the sensing means is in the form of a magnetic transducer;

Fig. 10 is a perspective detail of a part of the magnetic transducer illustrated in Fig. 9;

Fig. 11 is a vertical section through the principal axis of the rotor shown in Fig. 9;

Fig. 12 is a perspective of a further modification of the invention in which the sensing means is in the form of a variable resistance;

Fig. 13 is a vertical section through the main axis of a rotor using variable resistances to sense gyrodynamic reactions of the form shown in Fig. 12; and Fig. 14 is a schematic wiring diagram illustrating a typical circuit for utilizing the invention when a rotor of the form shown in Fig. 12 is employed.

The principle of the present invention is schematically illustrated in Fig. 1, which shows essentially a non-resonant rotor 1 adapted for rotation on a shaft or spindle 2. As well understood in the gyroscopic art, if the illustrated apparatus is considered to be spinning in a clockwise direction around the point 3 of the shaft 2, a force directed against the top of the shaft 2 in the plane of the axis X—X as indicated at 4 will result in a disturbance of the shaft in the direction of the Y—Y axis, at right angles to the direction of the force 4 as indicated by the arrow 5. This phenomenon is peculiar to gyroscopes of the spinning wheel variety and is known as "precession." While the observed precessional movement of the entire spinning element under the influence of a force 4 will be in the direction of the arrow 5, the internal elements of the rotor 1 are not continually urged in one direction, but are subjected to gyrodynamic energy that results in an alternating acceleration, undergoing a complete reversal on each revolution of the rotor 1. Thus, an element of the rotor 1 on the axis Y—Y and to the left of the shaft 2 as shown will be acted upon by an acceleration in an upward direction, as a result of the force indicated at 4, while an element on the same axis but to the right of the shaft 2 will undergo a downward acceleration. The forces tending to deflect the elements will be in an opposite sense and the variation of force on an element of the rotor 1, starting from a position on the axis X—X in a plane forward of the shaft 2 is shown by the curve 6 in Fig. 2. The dotted line 7 indicates the same force variation on an element on the same axis but 180° apart. It will be noted that the force fluctuation is sinusoidal in character, reaches a maximum as the element passes through the plane of the precessional reaction, and is zero as the element passes through the plane of the disturbing force. As long as the rotor 1 is non-resonant, the amplitude of the force curve is a function of the disturbing force 4. It will now be apparent that one or more sensing means as indicated at 8 and 9 supported as elements of the non-resonant rotor 1, for rotation around the spinning axis of the shaft 2 and connected together in such a manner that their reactions are additive, can be employed to indicate the magnitude and direction of a force tending to disturb the axis of the shaft 2. If two sensing elements located 180° apart as indicated at 8 and 9 are employed, the force curve resulting from such an arrangement will appear as shown by the curve 10 in Fig. 2. If, by way of example, the sensing means 8 and 9 are assumed to be strain-sensitive elements such as piezoelectric crystals connected in series and having leads 11 and 12 brought out through the axis of the shaft 2, the element 8 will be deflected downwardly under the conditions shown in Fig. 1, while the crystal 9 will be deflected upwards. A sensitive galvanometer placed across the leads 11 and 12 will reflect the voltage variation resulting from the force cycle imposed on the crystals 8 and 9 as they are revolved about the shaft 2, and a current pattern during one cycle will appear as the curve 10 in Fig. 2. The current thus produced may be directed through appropriate circuitry and apparatus to either measure the nature of the force 4 or in turn, to control the structure of which the gyroscopic apparatus is a part in order to overcome the force 4. It is to be particularly noted that the useful information or reactions of the arrangement thus described are not derived as a function of the mass of the rotor 1, as in the case of conventional gyroscopes. The sole function of the rotor 1 in the present case is simply as a means of support for the elements 8 and 9.

Similarly it will be observed that the sensing reactions are obtained from elements of the rotor itself, rather than from the supporting structure, as is the case in conventional gyroscopes, and because of this the necessity for obtaining and maintaining relatively delicate bearings and support means is, entirely overcome.

As thus described, the invention may be characterized is a means for utilizing gyrodynamic energy comprising non resonant sensing means adapted for rotation around an axis and being responsive to gyrodynamic reactions resulting from forces tending to disturb the axis of rotation.

Fig. 3 represents a schematic arrangement of an electrical system suitable for use in connection with gyroscopic apparatus of the type under consideration when the sensing means as represented by 8 and 9 of Fig. 1 are in the form of self-energizing devices such as piezoelectric crystals or magnetic transducers. In the drawing, the gyroscopic apparatus comprising the power driven rotor is represented at 14. The motor for driving the rotor is enclosed within the apparatus 14 and is driven through leads 15 and 16 from an external power supply.

It is contemplated that the apparatus 14 be supported on and fixed to a movable body such as an aircraft, ship, missile, or other form of vehicle in which it is desirable to control and measure the disturbing forces to which the moving body is subjected.

The strain-responsive elements of the rotor are electrically interconnected so that their reactions are additive, and are brought out from the apparatus 14 through leads 17 and 18, corresponding to the leads 11 and 12 of the schematic arrangement shown in Fig. 1. The magnitude of the electrical reactions of strain responsive elements of the self-energizing type are generally of too low an order to permit direct measurement or control, and it is therefore desirable or necessary to amplify them in some manner. For this purpose, the reactive currents from the apparatus 14 are fed into an amplifier 19 through the leads 17 and 18, which for the present example, may be considered to be a conventional and well understood amplifier of the electronic type, having as many stages of amplifications as are desired.

In order to utilize the present invention to realize directional sense of the disturbing angular forces on the gyroscopic apparatus 14 and upon the structure to which it is attached, some form of phasing is necessary. This will be apparent by reference to Fig. 1 wherein it will be seen that when the sensing elements 8 and 9 produce a pulse or reaction resulting from angular movements about an axis at right angles to the shaft 2, it is necessary to determine the position of the elements in relation to their 360° orbit in order to orient the disturbing angular force with respect to the spin axis of the rotor, or in relation to its supporting structure.

While here are several means of accomplishing phasing for this purpose, it is a direct function of the rotation of the apparatus 14 and for the present example as well as the specific embodiments hereafter described, the phase sensing instrumentation is contemplated as being directly connected to and associated with one end of the rotor shaft.

In Fig. 3 a form of phasing apparatus 20 is schematically indicated, comprising two pairs of fixed coils 21 and 22, and a rotating coil 23. The coil 23 is associated with and directly rotated by the shaft of the gyroscopic apparatus 14. The pairs of coils 21 and 22 are concentrically fixed around the rotating coil 23 in its plane of rotation and are disposed at 90° to each other, each pair being connected together in series. The amplified pulse from the strain-responsive elements of the gyroscopic apparatus 14 is impressed across the rotating coil 23 through the leads 24 and 25. The inductive reaction of the pulse as impressed on the rotating coil 23 effects either the stationary coils 21 located on the axis marked X—X, or the coils 22 located on the axis marked Y—Y depending upon the angular relationship therebetween. Each pair of fixed coils 21 and 22 are connected to ground and to an indicator or control which is in turn grounded, to complete the indicating or control circuits. The coils 21 are connected to an indicator or control 26 through a lead 27 which measures or controls angular disturbances about the axis X—X, and the coils 22 are connected by a lead 29 to an indicator 28 which similarly indicates or controls disturbances about the axis Y—Y of the gyroscopic apparatus 14. It will be obvious to those skilled in the art, that the instruments 26 and 28 may comprise measuring, recording, or motive means of a variety of forms, and may be connected together to integrate responses at any position of the rotating coil 23 with respect to the fixed secondaries 21 and 22.

The apparatus illustrated in Figs. 4, 5 and 6 exemplifies one arrangement of rotor for use in connection with the non resonant gyroscopic apparatus 14 of the present invention, in which the sensing elements designated as 8 and 9 in the schematic arrangement of Fig. 1, are piezoelectric in character and produce a measurable electric current as a result of mechanical strains causing their deflection. In this form, the rotor 30 comprises essentially a pair of supporting discs 31 and 32 fixed to rotate with a shaft 33 and having mating cavities 34 and 35 respectively, in which are disposed a pair of diametrically opposed piezoelectric elements 36 and 37. The dimensions of the piezoelectric elements 36 and 37 are less than the internal dimension of the compartment formed by the cavities 34 and 35 when the discs 31 and 32 are positioned together with the cavities in alignment.

As shown in Fig. 5, each of the piezoelectric elements 36 and 37 comprises a thin wedge-shaped wafer or crystal 38 of piezoelectric material having its base embedded in a block 39 formed of insulating material such as rubber. A pair of leads 40 and 41 are attached to the crystal 38 and brought out through the rear face of the block 39.

A variety of piezoelectric materials may be used to form the crystal 38, as for example, Rochelle salt or ammonium dihydrogen phosphate. The block 39 conforms to and surrounds the base of the generally triangular crystal 38 and extends approximately one-third of its height. The thickness of the block 39 is such that when clamped between the discs 31 and 32 within the compartment formed by the cooperating cavities 34 and 35, the base or embedded portion of each crystal 38 is firmly supported therein, while the exposed apex of each is spaced from the sides of the cavities 34 and 35 to permit flexure of the crystals 38. The sides of the cavities 34 and 35 are tapered together toward the periphery of the discs 31 and 32, and the generally triangular shape of the elements 36 and 37, having their widest portions disposed adjacent to the shaft 33, provides wedge-shaped elements which resist radial movement in the discs 31 and 32, the centrifugal forces resulting from rotation of the latter merely seating the piezoelectric elements 36 and 37 more securely in their mounting. The discs 31 and 32 are adapted to be fastened together in assembly, with the cavities 34 and 35 in alignment and with the piezoelectric elements 36 and 37 supported therein, by bolts or screws extending through holes in the disc 31 into mating tapped holes 42 in the disc 32.

While the illustrated construction employs a pair of piezoelectric elements 36 and 37 diametrically disposed around the shaft 33, it is contemplated that any number of such elements may be similarly mounted about the shaft 33 if so desired.

The shaft 33 is hollow and has a central axial bore 43. A lateral hole 44 is provided adjacent the inner faces of the blocks 39 communicating with the axial bore 43. The piezoelectric elements 36 and 37 are connected together in series and the two free leads are brought out through the hole 44 and the axial bore 43.

Thus described, the rotor 30 characterizes a means for utilizing gyrodynamic energy comprising a non-resonant assembly including one or more strain-responsive elements supported for rotation around an axis and adapted to sense gyrodynamic reactions tending to disturb the axis of rotation.

Fig. 7 illustrates an arrangement for supporting and driving a rotor of the above description to form the gyroscopic apparatus 14, comprising essentially a generally cylindrical housing or body portion 45 having a motor compartment 46 at one end in which an electric motor 47 is supported and a rotor compartment 48 at the other, a coverplate 49, and a base plate 50. The motor 47 comprises an armature 51 supported for rotation between the stator coils 52, the current for operation of the motor being brought into the assembly through brushes 53. A central web or diaphragm 54 in the housing 45 is provided with a central bore 55 to receive and accommodate a ball type bearing 56 in which is journalled one end of the drive shaft 57 of the motor 47.

The base plate 50 is adapted for alignment with and to be secured to the lower end 58 of the housing 45 to form the enclosed motor compartment 46 by means of bolts 59 passing through an external rim 60 and which additionally serve to secure the apparatus 14 to the structure 61 on which it is mounted.

A central counterbore 62 in the upper face of the baseplate 50 accommodates a ball type bearing 63 in which the lower end of the motor drive shaft 57 is journalled.

The coverplate 49 is adapted to be secured to the upper face 64 of the housing 45 by means of screws 65 extending into tapped holes 66 in a flanged rim 67 of the housing 45, to form the rotor compartment 48.

While a variety of forms of rotors may be employed for the purposes of this invention in connection with the arrangement of Fig. 7, including the modifications hereafter described, it may be considered that the rotor shown is of the form described above and illustrated in Figs. 4, 5, and 6. The rotor compartment 48 is conformed to support the rotor 30 for rotation through a driving connection with the drive shaft 57 of the motor 47. For this purpose the lower end of the rotor shaft 33 is connected to the upper end of the drive shaft 57 by means of a flexible coupling 68 of conventional form. The upper end of the rotor shaft 33 extends through the coverplate 49 and is journalled in a bearing 69 centrally secured in a counterbore 70 in the lower surface of the coverplate 49. The upper end of the rotor shaft 33 projects beyond the coverplate 49 and is fitted with a terminal cap 71 of dielectric material having a pair of spaced circumferential conductors 72 and 73. Leads 40 and 41 from the piezoelectric elements 36 and 37 are disposed within the hollow axial bore 43 of the shaft 33 and are connected through the terminal cap 71 to the conductor 72 and 73.

A cover box or shell 74 encloses the upper end of the rotor shaft 33 and phasing means and is secured to the upper surface of the coverplate 49 by means of screws 75 passing through an outwardly disposed flange 76 into threaded mating holes in the coverplate 49. The cover box 74 is formed with a boss or solid portion 77 adjacent the terminal cap 71 when it is assembled around the rotor shaft 33, which supports and positions a pair of brush assemblies 78 and 79 bearing against the conductors 72 and 73 respectively and connected to leads 80 and 81 which correspond with the conductors 17 and 18 in the schematic wiring diagram of Fig. 3. The electrical reactions of the strain-sensitive elements 36 and 37 in accordance with the principles of the invention, are transmitted through the leads 40 and 41, the conductors 72 and 73, the brush assemblies 78 and 79, and the leads 80 and 81 to be utilized as contemplated through circuity as exemplified in Fig. 3.

Phasing apparatus 82 for the purpose heretofore described is incorporated in the arrangement of Fig. 7 but differs from that described in connection with Fig. 3, in the substitution of an elongated inductor arm 83 fixed to rotate on the upper end of the rotor shaft 33 by a set screw 84 and a fixed primary induction coil 85 surrounding the upper end of the rotor shaft 33 and fixed upon the coverplate 49 beneath the inductor arm 83, in place of the rotating primary coil 23 described in connection with Fig. 3. The phasing apparatus 82 as depicted in Fig. 7 is functionally the equivalent or that shown and described in Fig. 3, but the necessity for slip rings to conduct current to a moving coil is eliminated.

The phasing apparatus 82 further includes a first pair of diametrically disposed secondary coils 86 and a second pair of secondary coils 87 located with their axis 90° apart from the coils 86. Both pairs of coils 86 and 87 are secured to the upper surface of the coverplate 49 with their axes horizontal and intersecting the shaft 33 in the plane of the inductor arm 83. Voltage impressed across the primary coil 85 induces a current in the inductor arm 83, and upon its rotation with respect to the pairs of secondary coils 86 and 87 a reaction is induced in the latter as the arm 83 passes through their axes. The inductor arm 83 is secured to the shaft 33 in such a manner that it lies in the same vertical plane as the strain-responsive elements 36 and 37. A pulse generated by the latter during their rotation will therefore result in an inductive reaction in the arm 83 causing a response in the coils 86 and 87 reflecting the angular position of the rotor 30 with respect to them at the time that the pulse is created. As an example, assuming the elements 36 and 37 of the rotor 30 to be in the plane Y—Y as indicated in Fig. 8, a current generated by them as a result of gyrodynamic force will energize the primary coil 85, induce a current in the inductor arm 83, and cause an electrical reaction in the coils 86 disposed in the axis Y—Y, the coils 87 lying on the axis X—X being relatively inactive. A similar pulse when the elements 36 and 37 of the rotor 30 are angularly disposed in the axis X—X will create a response in the coils 87 while the coils 86 remain unaffected. It will thus be seen that integration of the electrical reactions of the pairs of secondary coils 86 and 87 by suitable instrumentation, can be used not only to determine the magnitude of the electrical reactions of the piezoelectric elements 36 and 37 and thus the character of disturbing forces impressed upon the gyroscopic apparatus 14 or its supporting structure 61, but also their relative direction.

The secondary coils 86 as shown in Fig. 8 are connected together in series by the lead 88 and correspond to the secondary coils 22 described in connection with Fig. 3. The secondary coils 87 are connected in series through a lead 89 and accomplish the same purpose as the coils 21 of the circuit in Fig. 3. The free ends of the secondary coils 86 are connected directly or through ground, to suitable indicators or controls for the utilization of reactions from the piezoelectric elements 36 and 37 when the latter are in the plane designated as Y—Y, and the free ends of the secondary coils 87 are connected in a similar manner for utilizing the reactions of the piezoelectric elements 36 and 37 when in a perpendicular plane designated as X—X.

The arrangement of Fig. 7 characterizes the present invention as a gyroscopic apparatus for sensing forces tending to disturb the apparatus or the structure upon which it is mounted comprising a non-resonant power driven rotor having strain-responsive means supported and spaced about its axis of rotation and phasing apparatus associated with the rotor to directionally relate impulses generated by the strain-responsive means as a result of forces tending to disturb the apparatus from its axis of rotation.

Figs. 9, 10, and 11 illustrate a modified form of rotor 90 for use in connection with the subject invention whereby the sensing means corresponding to the elements 8 and 9 of the schematic arrangement shown in Fig. 1 are in the form of a magnetic transducer utilizing the principle of shifting the relative position of a coil in a magnetic field in order to produce a current. In this modification, the rotor 90 is non-resonant and comprises essentially a supporting disc 91, a mating coverplate 92, a shaft 93 and a flexible coil supporting strip 94. The supporting disc 91 and the cover plate 92 are formed of non-magnetic material and are adapted to fit together to form an internal cavity 95 in which the coil supporting strip 94 is housed, and to be secured to and be driven by the shaft 93.

The supporting disc 91 is provided with a pair of radially extending cavities 96 spaced 180° apart in which the outer ends of the coil supporting strip 94 are disposed in such a manner that they may flex in a direction parallel to the shaft 93. Within each of the cavities 96 adjacent the outer periphery of the supporting disc 91 is positioned a cylindrical permanent magnet 97 having an upper face flush or coplanar with the lower surface of the cavity 96. Each of the permanent magnets 97 is formed with a circular channel 98 in its upper face thus forming an outer peripheral ring 99 which acts as the north pole of the magnet, and a central cylindrical portion 100 acting as the south pole. The inner edge 101 of the peripheral ring 99, and the opposing inner edge 102 of the central cylindrical portion 100 are extended towards each other to define opposed sharpened edges which provide a gap 103 in which the magnetic field of the permanent magnet 97 is concentrated.

The coil supporting strip 94 is flexible and formed of thin sheet metal, preferably brass in order to minimize the effect of stray magnetic fields within the device. The strip 94 is provided with a central hole 104 accommodating the shaft 93 and is adapted to be rigidly secured to the upper face of the supporting disc 91 at its center by means of a non-magnetic block 105 through which screws 106 disposed around the shaft 93 pass through mating holes in the strip 94 into tapped holes in the disc 91.

Each of the unsupported outer ends of the strip 94 are formed with a hole 107 in which is secured a cylindrical non-magnetic shell or coil support 108 extending downwardly from the lower face of the strip 94 and on which is wound a number of turns of fine wire forming a coil 109. The diameter of the coil supports 108 is such as to permit their passage with the coils 109 through the gaps 103 of the permanent magnets 97, and they are disposed in the strip 94 in such a manner that when the latter is secured in assembly to the supporting disc 91, the coil supports 108 are aligned with the gaps 103 so that flexure of the outer ends of the strip 94 moves the coils 109 within the gaps 103 thus inducing a current in the former which varies in relation to the coils' position with reference to the edges forming the gaps 103. Each coil 109 is provided with a pair of leads 110 and 111 which are led out through suitable holes in the coil support 108. The coils 109 are connected in series and the free leads are brought through a radial hole 112 above the block 105 communicating with an axial bore 113 in the shaft 93.

The coverplate 92 conforms in diameter to the supporting disc 91 and may be fastened in assembly thereto as by screws (not shown) passing through it into mating threaded holes 114 in the disc 91. The lower surface of the coverplate 92 is relieved to form the internal cavity 95 so that the coil supporting strip 94 may flex in a direction parallel to the shaft 93 without contact between it and the surrounding structure.

The rotor 90 as thus described characterizes gyroscopic apparatus for the purposes contemplated by this invention in which the sensing elements associated in the form of a rotor comprise a magnetic transducer whereby gyrodynamic reactions imposed on the sensing elements as a result of forces tending to disturb the spinning axis of the rotor move a coil in a magnetic field to generate a current which is used to determine the character of the disturbing forces. As heretofore described, when the rotor 90 is incorporated in the non-resonant gyroscopic apparatus 14 and used as contemplated by the present invention, a disturbing force imposed on the apparatus when in operation will flex the coil support strip 94 moving the coils 109 in opposite directions and generating currents in each as a result of their movement through the magnetic fields in the gaps 103. By reason of their series connection the pulses from each coil are additive and the resultant current may be used as desired to measure or control the forces on the apparatus.

The rotor 90 may be mounted, driven, and phased in the same manner as the rotor 30 as described in connection with the gyroscopic apparatus 14 described and shown in Figs. 3 and 7.

Figs. 12 and 13 illustrate still another modified form of rotor adapted for use inconnection with the present invention in which the sensing elements 8 and 9 of the schematic arrangement shown in Fig. 1 are in the form of variable resistances which function in such a manner that the alternating forces produced in the rotor of the gyroscopic apparatus resulting from disturbing forces on its support act to valve or vary the rate of flow of electrical energy supplied from some exterior source, as for example, a battery. This modified form of rotor differs from the two forms heretofore described, in that the sensing elements are not self-energizing, but serve to vary the characteristics of an externally supplied current. By this means, signals of considerable strength may be obtained since the signal strength level is not dependent upon the rate of disturbance of the gyro, but is a function of the character of the applied current.

In this arrangement the rotor 114 is formed essentially of a supporting disc 115, a coverplate 116, a shaft 117 to which the supporting disc 115 and the mating coverplate 116 are adapted to be secured and driven, a resilient contact strip 118 and a pair of carbon buttons 119.

The supporting disc 115 and the coverplate 116 are preferably formed of non-conductive material or are otherwise insulated from the other elements of the device. The coverplate 116 is relieved on its lower mating face to provide a cavity 120 in which the contact strip 118 is mounted. The supporting disc 115 is provided with a pair of radial cavities 121 spaced 180° apart and extending outwardly from the centrally disposed shaft 117.

The carbon buttons 119 are secured in holes 122 provided in the supporting disc 115 adjacent its periphery and within the cavities 121.

The elongated resilient contact strip 118 is formed of electrically conductive material such as brass or copper and is provided with a central hole 123 through which shaft 117 is disposed of such a diameter that there is no contact between the strip 118 and the shaft 117. The resilient contact strip 118 is secured at its center to the upper face of the supporting disc 115 by means of a non-conductive block 124 having a central hole 125 accommodating the shaft 117, and a number of outwardly disposed holes through which screws 126 pass through mating holes in the contact strip 118 and into tapped holes in the supporting discs 115.

The outer ends of the contact strip 118 extend over the carbon buttons 119 and are provided with contacts 127 secured thereto in alignment with the axes of the carbon buttons 119. The contact strip 118 is formed with upwardly projecting bent portions 128 between the edge of the block 124 and the contacts 127 so that when it is secured to the supporting disc 115, its outer ends are pressed against the carbon buttons 119 through the contacts 127 providing a pre-determined pressure between the elements when in their assembled positions.

A conductor 129 is led into the cavity 120 through an axial bore 130 in the shaft 117 and through a radial hole 131 communicating therewith above the block 126, and its end is electrically connected at 132 to the contact strip 118. Leads 133 and 134 are electrically connected to the lower ends of the carbon buttons 119 and are brought out from the cavity 120, the radial hole 131 and the axial bore 130 in the shaft 117. An electric current flowing through the conductor 129 and the contact strip 118, the carbon buttons 119, and the leads 133 and 134 will be varied in response to the pressure impressed by the contact strip 118 on the carbon buttons 119. It will be seen that the rotor 114 when used in connection with the gyroscopic apparatus 14 as contemplated by the invention will be subjected at the opposed ends of the contact strip 118 to equal but directionally opposite gyrodynamic reactions as a result of forces tending to disturb the spinning axis of the apparatus or its supporting structure. A downward reaction on one end of the contact strip 118 will increase the pressure on the carbon button beneath it, lowering its effective resistance and passing more current through it, while the simultaneous upward reaction on the opposed end of the contact strip 118 will lessen the pressure on the carbon button 124 beneath it, increase its resistance, and thus decrease the current flowing through it. The continued effect of a disturbing force on the device during its rotation will therefore result in an alternating flow of current through the device of sinusoidal character, the magnitude of the wave being dependent upon the magnitude of the disturbing force.

It is contemplated that the rotor 114 be mounted, driven, and phased by the same arrangement as shown in Fig. 7 for accommodating the same functions with regard to the rotor 30. The rotor 114 exemplifies a modification of the present invention in which the sensing means for determining the character of disturbing forces to which gyroscopic apparatus is subjected, comprises a strain-responsive device for varying the characteristics of an externally applied source of electrical energy adapted to be rotated around the spinning axis of the gyroscopic apparatus.

Fig. 14 is a schematic wiring diagram illustrating a typical electrical arrangement for operating the gyroscopic apparatus using a rotor 114 of the type shown in Fig. 13 for the purposes of the invention. In the diagram, the gyroscopic apparatus 137 is contemplated as being of the general form shown in Fig. 7 but in which a rotor as illustrated in Fig. 13 is incorporated. Power for driving the enclosed electric motor is fed to the apparatus through a pair of conductors 138 and 139 from an external power supply. The primary side of a transformer 140 is connected through leads 141 and 142 to a pair of carbon buttons 143 which correspond with the carbon buttons 119 described in connection with the rotor 114 of Fig. 13. The leads 141 and 142 may be electrically connected to the buttons 143 by means of slip rings or the like. One side of a battery 144 or other source of direct current is connected by a conductor 145 to a tap on the primary side of the transformer 140, and the other side is electrically connected by means of a conductor 146 through a slip ring or the like to the contact strip 147 supported in the rotor of the apparatus 137 which corresponds to the contact strip 118 of the rotor 114 described in connection with Fig. 13. An electrical circuit is thus provided between the battery 144 and the primary side of the transformer 140, the current flowing through one or the other of the carbon buttons 143 to the transformer in proportion to their effective resistance produced by the pressure of the contact strip 147 on the buttons 143 resulting from the gyrodynamic reactions influencing the apparatus 137. When the apparatus 137 is gyrodynamically stable, the current in the circuit is divided equally through the carbon buttons 143, since their resistances are equal, and remains direct and unidirectional in character so that the transformer 140 remains unenergized. An unbalanced condition of the contact strip 147 resulting from forces tending to disturb the gyroscopic apparatus 137 varies the current passing through one or another of the conductors 141 and 142, creating an alternating pulse which induces a current in the secondary of the transformer 140 which may be fed through leads 148 and 149 to a conventional electronic amplifier 150 having as many stages of amplification as desired.

Phasing apparatus 151 is directly associated with the gyroscopic apparatus 137 corresponding in function and form to the apparatus 20 shown and described in connection with the ararngement of Fig. 3. The phasing apparatus consists of a rotating primary coil 152 adapted to be driven directly from the drive shaft of the gyroscopic apparatus 137 and to be mounted in pre-determined angular relationship with respect to the contact strip 147. A pair of fixed secondary coils 153 spaced 180° apart and connected in series are disposed on either side of the rotating primary coil 152 in an axis designated as Y—Y in the drawing, and a second pair of secondary coils 154 is similarly mounted in a plane 90° apart therefrom and are similarly connected in series. Current from the amplifier 150 is connected across the rotatable primary coil 152 through the leads 155 and 156. One side of the fixed secondary coils 153 is connected by a lead 157 to an indicator or control 158 to which the other side is connected through ground. The fixed secondaries 154 are similarly connected through a lead 159 and ground to an indicator or control 160. When the current produced by the battery 144 is varied to produce an alternating pulse resulting from gyrodynamic reactions on the rotor of the gyroscopic apparatus 137, the pulse is inductively transmitted to the transformer 140, amplified by the amplifier 150, and transmitted to the rotating primary coil 152. A similar reaction is induced in the fixed secondaries 153 or 154 depending upon the position of the coil 152 with respect to their inductive axes and is reflected in the indicators 158 or 160. The magnitude of the disturbing force on the gyroscopic apparatus 137 is determinable from the magnitude of the impulse transmitted through the system, and its direction with respect to the apparatus 137 or the structure upon which it is supported is determinable by the phasing apparatus 151 as heretofore more fully described. It is understood that the indicators 158 or 160 are merely representative of a wide variety of devices that may be used as desired to measure and record the disturbing forces or to control a motive unit such as a synchronous motor or the like for counteracting the forces.

Ths eensing means shown and described in connection with rotor forms 30, 90 and 114 exemplify only a few of a wide range of devices capable of use in connection with the present invention. These particular embodiments, however, are considered especially preferable considering the problems of sensitivity, stability, high gain, suitable signal production, linearity of response curve, and simplicity. We do not desire, however, that the present invention be limited to these specific embodiments since it is contemplated that the adavntages to be derived from the invention may be obtained by substituting various other forms of sensing devices such as strain gauges, spring-loaded contacts, carbon impregnated strips, or vacuum tubes in which one or the other elements are strain-responsive to vary the characteristics of the tube.

As thus described, the gyroscopic apparatus contemplated by the present invention provides an improved means of utilizing gyrodynamic energy having the following advantages over conventional apparatus of the type under consideration:

*a*. The necessity for heavy rotating masses is eliminated and the power requirements for driving the apparatus are correspondingly reduced.

*b*. Problems inherent in the pivotal suspension of conventional types of gyroscopic equipment are eliminated.

*c*. Balancing problems are minimized.

*d*. No limitation as to angular range of movement.

*e*. Resonant frequencies of the apparatus may be designed to be considerably beyond the range of frequencies encountered in the mounting structure.

*f*. A single rotor is sensitive in all directions.

*g*. Gyrodynamic reactions are apprehended directly from the rotor, eliminating errors of transmission through non-gyrodynamic elements.

*h*. Signals are alternating or pulsating in form and therefore are readily applicable to electronic networks.

The invention is not to be understood as restricted to the details set forth since these may be modified within the scope of the appended claims without departing from the spirit of the invention.

Having thus described the invention what I claim as new and desire to secure by Letters Patent is:

1. Apparatus for utilizing gyrodynamic energy comprising strain-responsive variable resistance means for varying the characteristics of an electric current adapted for rotation around an axis, means for providing continuous rotation to said resistance means, a source of electric current operatively connected to said variable-resistance means, and means operatively connected to said variable-resistance means for apprehending the variations in the character of said electric current resulting from gyrodynamic reactions on said strain-responsive variable resistance means of a force tending to disturb said strain-responsive variable resistance means relative to its axis of rotation.

2. Apparatus for utilizing gyrodynamic energy comprising strain-responsive variable resistance means adapted for rotation around an axis, means for providing continuous rotation to said resistance means, a source of electric current connected in series with said variable resistance means to form a circuit, and means operatively associated with said apparatus for apprehending the variations in the character of the electric current in said circuit resulting from gyrodynamic reactions on said strain-responsive variable resistance means of a force tending to disturb said strain-responsive variable resistance means relative to its axis of rotation.

3. In a gyroscopic apparatus having a power driven rotor, variable resistance means rotated with said rotor and spaced from its axis of rotation adapted to vary the character of a current in response to gyrodynamic reactions of a force tending to disturb said rotor from its axis of rotation, a source of electric current operatively connected to said variable resistance means, and means associated with said apparatus to apprehend the character of said electric current.

4. Apparatus for utilizing gyrodynamic energy comprising a rotor consisting of a rotatable spindle, non-resonant sensing means, and means affixing said sensing means to said spindle for rotation bodily therewith, said sensing means being responsive to gyrodynamic reactions resulting from a force tending to disturb the axis of rotation thereof, and phasing means operatively connected to said sensing means whereby responses therefrom are oriented to the direction of this disturbing force with respect to the position of said sensing means in its orbit.

5. Apparatus for utilizing gyrodynamic energy comprising a rotor consisting of a rotatable spindle, piezoelectric sensing means, and means affixing said piezoelectric sensing means to said spindle for rotation bodily therewith, said piezoelectric sensing means being responsive to gyrodynamic reactions resulting from a force tending to disturb the axis of rotation thereof, and phasing means adapted to be energized by responses from said sensing means operatively connected to said sensing means to orient the direction of said disturbing force with respect to the position of said sensing means in its orbit.

6. In a gyrodynamic apparatus including non-resonant transducer means adapted to be rotated about an axis to sense a force tending to disturb the axis of rotation, phasing means associated with said transducer means comprising inductor means adapted to rotate in fixed relation with said transducer means operatively connected to said transducer means and a stationary inductance associated with said inductor and adapted to be energized thereby, and means operatively connected to said inductance to apprehend signals from said transducer means and to orient the direction of said force with respect to the position of said transducer means in its orbit.

7. In a gyrodynamic apparatus including an electric non-resonant transducer adapted to be rotated about an axis and being responsive to a force tending to disturb the axis of rotation, phasing means associated with said transducer comprising a primary inductor adapted to rotate in fixed relation with said transducer and to be energized thereby and a secondary inductance associated and in fixed relation with said inductor and adapted to be energized thereby, and means operatively connected to said secondary inductance to apprehend signals from said transducer and to orient the direction of said force with respect to the position of said transducer in its orbit.

8. In a gyrodynamic apparatus including an electric non-resonant transducer adapted to be rotated about an axis and being responsive to a force tending to disturb the axis of rotation, phasing means associated with said transducer comprising a primary inductance operatively connected to said transducer, an inductor fixed to rotate with said transducer and associated with said primary inductance to be energized thereby, and a secondary inductance associated with and disposed with its axis in the plane of said inductor and adapted to be energized thereby, and means operatively connected to said secondary inductance to apprehend signals from said strain-responsive means and to orient the direction of said force with respect to the position of said strain-responsive means in its orbit.

9. In combination with a gyrodynamic apparatus having a power driven rotor consisting of non-resonant electric transducer means, a rotatable spindle and means mounting said transducer means to said rotatable spindle for rotation bodily therewith, and means operatively connected with said transducer means to apprehend responses therefrom, said transducer means comprising a piezoelectric crystal having a base portion rigidly secured adjacent the axis of rotation of said rotor and an apex portion spaced from said base portion free for flexure in a direction parallel to the axis of rotation of said rotor.

10. In combination with a gyrodynamic apparatus having a power driven rotor consisting of non-resonant electric transducer means, a rotatable spindle and means mounting said transducer means to said rotatable spindle for rotation bodily therewith, and means operatively connected with said transducer means to apprehend responses therefrom, said transducer means comprising a pair of diametrically opposed piezoelectric crystals connected in series and each of said crystals having a base portion rigidly secured adjacent the axis of rotation of said rotor and an apex portion spaced from said base portion free for flexure in a direction parallel to the axis of rotation of said rotor.

11. In combination with a gyrodynamic apparatus having a power driven rotor, transducer means associated with said rotor and means operatively connected with said transducer means to apprehend responses therefrom, said transducer means comprising a coil mounted on a flexible strip secured adjacent the axis of rotation of said rotor and spaced from said axis of rotation for movement in a direction parallel to the axis of rotation of said rotor, and means supported in fixed relation with the said axis of rotation providing a magnetic field in the path of movement of said coil.

12. In combination with a gyrodynamic apparatus having a power driven rotor, magnetic transducer means associated with said rotor and means operatively connected with said transducer means to apprehend responses therefrom, said transducer means comprising a flexible supporting strip secured at its center at the axis of rotation of said rotor, a pair of coils mounted on said strip on either side of said axis of rotation for movement parallel to said axis of rotation, and magnet means supported in fixed relation to said axis of rotation providing a magnetic field in the path of movement of said coil.

13. Gyroscopic apparatus for measuring or controlling a force tending to disturb the structure whereby said apparatus is supported comprising a rotor consisting of a rotatable spindle and non-resonant sensing means supported on said spindle for rotation therewith and adapted to produce a signal of alternating character as a result of the gyrodynamic reaction of said disturbing force on said sensing means, means connected to said sensing means to amplify said signals, phasing means connected to said amplifying means to relate said signal to the direction of said force, and means connected to said phasing means to apprehend said signal.

14. Gyroscopic apparatus for measuring or controlling a force tending to disturb the structure whereby said apparatus is supported comprising a rotor consisting of a rotatable spindle and non-resonant strain-responsive piezoelectric means supported on said spindle for rotation therewith and adapted to produce a signal of alternating character as a result of the gyrodynamic reaction of said disturbing force on said piezoelectric means, means connected to said piezoelectric means to amplify said signals, phasing means connected to said amplifying means to relate said signal to the direction of said force, and means connected to said phasing means to apprehend said signal.

15. Gyroscopic apparatus for measuring or controlling a force tending to disturb the structure whereby said apparatus is supported comprising magnetic transducer means supported for rotation around an axis and adapted to produce a signal of alternating character as a result of the gyrodynamic reaction of said disturbing force on said transducer, means connected to said transducer means to amplify said signals, phasing means connected to said amplifying means to relate said signal to the direction of said force, and means connected to said phasing means to apprehend said signal.

16. Gyroscopic apparatus for measuring or controlling a force tending to disturb the structure whereby said apparatus is supported comprising strain-responsive electric current varying means supported for rotation around an axis and adapted to affect a current of variable alternating character as a result of the gyrodynamic reaction of said disturbing force on said current varying means, a source of electrical current connected to said current varying means to form a circuit, means connected to said circuit to amplifying said current, phasing means connected to said amplifying means to relate said current to the direction of said force, and means connected to said phasing means to apprehend the character of said current.

17. Gyroscopic apparatus for measuring or controlling a force tending to disturb the structure whereby said apparatus is supported comprising strain-responsive variable resistance means supported for rotation around an axis and adapted to affect a current of variable alternating character as a result of the gyrodynamic reaction of said disturbing force on said variable resistance means, a source of electrical current connected to said variable resistance means to form a circuit, means connected to said circuit to amplify said current, phasing means connected to said amplifying means to relate said current to the direction of said force, and means connected to said phasing means to apprehend the character of said current.

18. In gyroscopic apparatus, a power driven rotor consisting of a central rotatable spindle, a plurality of piezoelectric crystals, and means mounting said piezoelectric crystals to said spindle for rotation bodily therewith, said piezoelectric crystals each having a base portion rigidly secured adjacent said spindle and an apex portion spaced from said base portion free for flexure in a direction parallel to the axis of rotation of said spindle.

19. In gyroscopic apparatus, a power driven rotor consisting of a central rotatable spindle, a pair of piezoelectric crystals electrically interconnected in series, and means affixing said pair of piezoelectric crystals to said spindle in diametric opposition for rotation bodily therewith, each of said piezoelectric crystals having a base portion rigidly secured adjacent said spindle and an apex portion spaced from said base portion free for flexure in a direction parallel to the axis of rotation of said spindle.

20. In gyroscopic apparatus, a rotor consisting of a rotatable spindle, a pair of opposing discs affixed to said spindle having mating cavities, and a plurality of piezoelectric means disposed in said mating cavities and held by said discs for rotation bodily with said spindle.

21. In gyroscopic apparatus, a power driven rotor consisting of a rotatable spindle, a pair of opposing discs centrally affixed to said spindle having mating cavities, and a pair of diametrically opposed, serially electrically interconnected piezoelectric means positioned within said cavities and held by said discs for rotation bodily with said spindle.

22. In gyroscopic apparatus, a power driven rotor consisting of a rotatable spindle, a pair of opposing discs centrally affixed to said spindle having mating cavities, and a pair of diametrically opposed, serially electrically interconnected piezoelectric means positioned within said cavities and held by said discs for rotation bodily with said spindle, each of said piezoelectric means embodying a wedge-shaped crystal having a base portion fixedly held adjacent said spindle and an apex portion spaced from said base portion free for flexure in a direction parallel to the axis of rotation of said spindle.

23. In gyroscopic apparatus, a power driven rotor consisting of a rotatable spindle, a pair of opposing discs centrally affixed to said spindle having mating cavities, a pair of diametrically opposed, serially electrically interconnected piezoelectric means positioned within said cavities, insulation means within said cavities held by said discs for supporting said piezoelectric means for rotation bodily with said spindle.

24. In gyroscopic apparatus, a power driven rotor consisting of a rotatable spindle, a pair of opposing discs centrally affixed to said spindle having mating cavities, a pair of diametrically opposed, serially electrically interconnected piezoelectric means positioned within said cavities, insulation means within said cavities held by said discs for supporting said piezoelectric means for rotation bodily with said spindle, each of said piezoelectric means embodying a wedge-shaped crystal having a base portion fixedly positioned by said insulation means adjacent said spindle and an apex portion spaced from said base portion free for flexure in a direction parallel to the axis of rotation of said spindle.

25. In gyroscopic apparatus, a power driven rotor consisting of a central spindle adapted for rotation about an axis, a pair of piezoelectric means responsive to gyrodynamic reactions resulting from a force tending to disturb the axis of rotation, and means cantileverly supporting said pair of piezoelectric means to said spindle for providing a portion of said piezoelectric means free for flexure in the prescence of a disturbing force.

References Cited in the file of this patent

UNITED STATES PATENTS

| 1,801,619 | Arrea | Apr. 21, 1931 |
| 1,841,606 | Kollsman | Jan. 19, 1932 |
| 1,890,831 | Smyth | Dec. 13, 1932 |
| 2,466,055 | Sierer, Jr. | Apr. 5, 1949 |
| 2,479,122 | Konet | Aug. 16, 1949 |
| 2,511,178 | Roters | June 13, 1950 |
| 2,605,093 | Dorand | July 29, 1952 |
| 2,615,961 | Means | Oct. 28, 1952 |

FOREIGN PATENTS

| 599,826 | Great Britain | Mar. 22, 1948 |
| 934,046 | France | Jan. 7, 1948 |